United States Patent Office 3,531,979
Patented Oct. 6, 1970

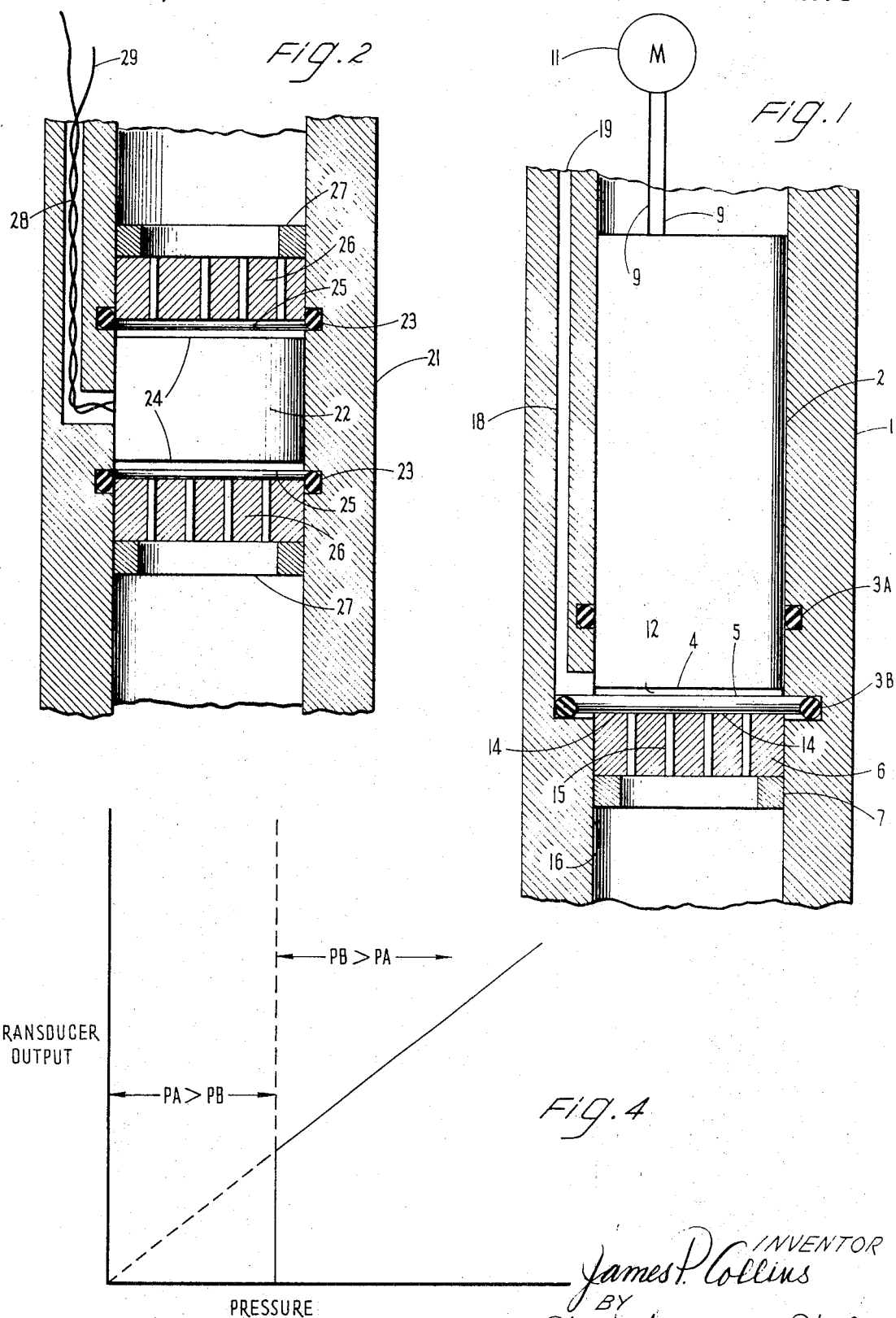

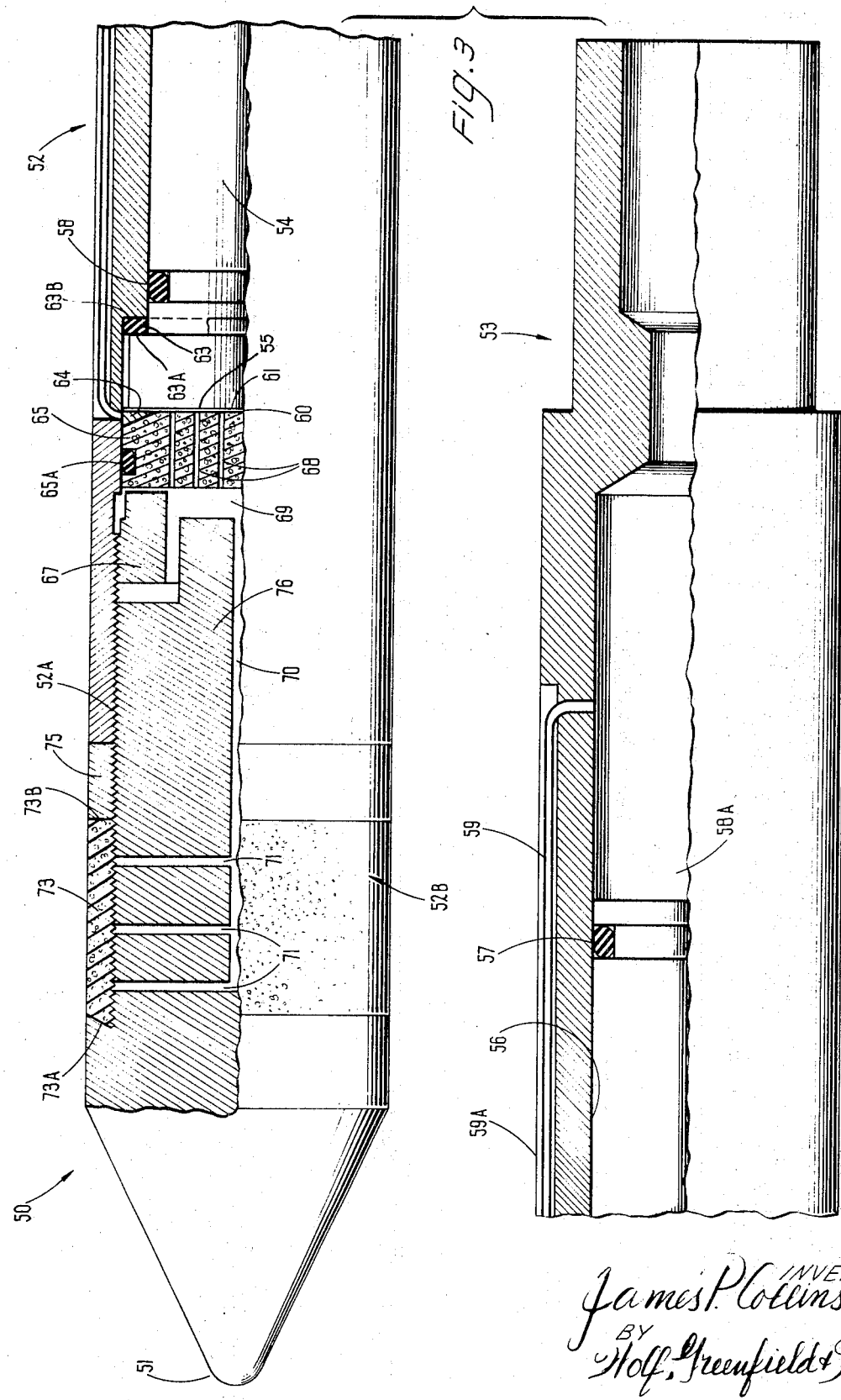

3,531,979
RECALIBRATION MEANS FOR A TRANSDUCER
James P. Collins, Belmont, Mass., assignor to Applied Geodata Systems, Inc., Cambridge, Mass., a corporation of Massachusetts
Filed Jan. 3, 1969, Ser. No. 788,791
Int. Cl. G01l 27/00
U.S. Cl. 73—4
12 Claims

ABSTRACT OF THE DISCLOSURE

A means for recalibrating a pressure transducer responsive to ambient pressures which comprises a casing within which the pressure transducer is positioned. A flexible diaphragm across one end of the casing is adapted to deflect in response to ambient pressures outside the casing to cause readings through the transducer. A remotely controllable pressure source is adapted to increase the pressure within the casing over ambient pressures. These controllable pressures are measurable and known. The flexible diaphragm is limited in outward deflection by a suitable backing member such as a pressure porous block. To recalibrate the transducer, the back pressure or pressure within the casing is increased over the ambient pressure to known pressure levels. The output signal of the transducer is then recalibrated relative to the known magnitudes of that back pressure as it is increased over the ambient pressure.

SUBJECT MATTER OF THE INVENTION

The present invention relates to a means and method of recalibrating pressure transducers and in particular to a means and method of recalibrating pressure transducers that are in remote locations.

BACKGROUND OF INVENTION

Calibration of pressure transducers may vary with time, temperature or treatment of the transducer. Further, transducers calibrations often are upset during installation of the transducer. Such variations in the accuracy of the transducer require recalibration. In many installations, such recalibrations do not impose a serious problem. Frequently the transducer is simply removed from its usual place of operation and is recalibrated against the known pressure or pressures. There are however, a number of transducer installations where removal of the transducer from its site or locus is impossible or impractical. If the transducer is used in a piezometer, it would ordinarily be buried within soil and consequently, not easy to remove. The transducer might be in a radioactive system which would have to be shut down in order to remove the transducer for recalibration. Such procedures are expensive and dangerous. Therefore, recalibration of transducers under such conditions has been theretofore impractical.

SUBJECT MATTER OF PRESENT INVENTION

It is therefore an object of the present invention to provide an improved means and method of recalibrating transducers and in particular, an improved means and method of recalibrating pressure transducers from remotely controlled positions. A further object of the present invention is to provide an improved means and method of recalibrating transducers which are located in remote or inaccessible areas such, for example, as in water, underground or in a nuclear reactor. Another object of the present invention is to provide a simple, effective means of recalibrating pressure transducers. A still further object of the present invention is to provide an improved means and method of recalibrating piezometers. One further object of the present invention is to provide an improved piezometer housing structure adapted to be used for recalibration.

In the present invention, there is provided a means for recalibrating a pressure transducer which is responsive to ambient pressures comprising, a means for operatively isolating the transducers from ambient pressures and a means for applying a known pressure to the transducer when isolated from the ambient pressures.

BRIEF DESCRIPTION OF DRAWINGS

The foregoing objects and advantages of the present invention will be more clearly understood when considered in conjunction with the accompanying drawings in which:

FIG. 1 is a schematic cross-sectional elevation of a device embodying the present invention;

FIG. 2 illustrates a modification of the invention;

FIG. 3 is longitudinal partially cross-sectioned view of a preferred embodiment of the present invention as used in conjunction with the recalibration of piezometers; and FIG. 4 is a graph used in describing the method of recalibration.

DETAILED DESCRIPTION OF PREFERRED EMBODIMENT

Referring to FIG. 1, there is illustrated, a means for recalibration of remote or inaccessible pressure transducers. The pressure transducer 2 may be of a wide variety of conventional pressure transducers. This transducer 2 has an active face 4 that is adapted to sense pressure variations. Suitable electrical or other connections are made from the transducer to a remote sensor. These connections may comprise electrical wires 9 connected to a meter 11 at a remote location. The transducer 2 is positioned within a housing or casing 1. Housing or casing 1 may take any suitable form. It may, for example, comprise a tubular member within which the transducer 2 is coaxially positioned. The housing 1 may be formed metal or other suitable material. The active face 4 of the transducer is positioned within a portion of the housing that is sealed against fluid or gas transmission from the medium in which the ambient pressure is being measured. This isolation may be effected by suitable pressure seals 3A and 3B. Pressure seal 3A extends circumferentially about the transducer 2 on one side of the active face 4 within the housing 1, while pressure seal 3B effectively seals a flexible diaphragm 5 within the inner wall of the housing 1 adjacent to and facing the active face 4, thus providing an inner chamber or section 12 immediately adjacent and between the inner surface of the diaphragm 5 and the active face 4. Diaphragm 5 should have negligible stiffness with respect to the active fall of the transducer, as, for example, in the order of 0.1%.

Positioned within the housing 1 on the side of the diaphragm 5 opposite to the transducer 2 is a backup member 6. This backup member 6 is a rigid member secured with a surface 14 parallel to the outer surface of the diaphragm 5. The backup member 6 is porous to the ambient pressure of the medium being measured. This may be provided by making the backup member 6 with a plurality of holes 15 that extend through the member 6 from one surface to the surface adjacent and parallel to the outer surface of the diaphragm 5. Alternately, the member 6 may be formed of a sintered porous material such as sintered metal or the like.

This member 6 may be suitably secured as, for example, by a retaining ring 7 that is welded or otherwise secured to the inner surface 16 of the transducer housing 1. The ring 7 butts against the outer surface of the member 6. The space between the inner surface of the member 6 and the active face 4 of the pressure transducer should be small enough so that negligible diaphragm stress (as opposed to flexural stresses) is induced in the diaphragm. The inner surface of the backup member 6 may normally face and substantially touch the outer surface of the diaphragm 5 when the ambient pressure is at a minimum.

A passage 18 extends through the housing 1 and has one end 19 connected to a suitable and known pressure source that is adapted to apply selected known pressures at controlled intervals. The other end of the passage 18 opens into the chamber formed between the transducer 1 and the diaphragm 5. In the operation of this means, the ambient pressure $P_a$ exerts pressure against the diaphragm 5 causing the diaphragm to flex against the active face of the transducer. The transducer in turn responds to the ambient pressure. When a recalibration is to be made, back pressure $P_b$ is applied from a suitable pressure means through the passage 18. This back pressure is both known and variable in a controlled fashion. The back pressure $P_b$ opposes the ambient pressure since it is applied to the opposite side of the diaphragm 5. If the back pressure $P_b$ is less than the ambient pressure $P_a$, the transducer face 4 is responsive to the ambient pressure $P_a$. However, when the back pressure $P_b$ is increased to a value greater than the ambient pressure $P_a$, the diaphragm is pushed against and is limited by the backup member 6. The transducer face 4 then responds to the back pressure $P_b$ for all such values that are greater than the ambient pressure. Since the back pressure $P_b$ is both known and variable, the meter 11 may be calibrated against this known input for a range of pressures above the ambient pressure. This is effectively illustrated in FIG. 4 where the transducer output is measured for various pressure values.

Now turning to FIG. 2, there is illustrated an alternate embodiment in which means are provided for recalibrating transducers having a plurality of active faces. In FIG. 2 the cylindrical housing 21 has a transducer 22 positioned within it. The transducer 22 may be a piezoelectric crystal type transducer having two active faces 24 lying normal or substantially normal to the axis of the housing 21. Facing each of these active faces 24 are the diaphragms 25 similar to the diaphragms previously described. These diaphragms 25 are positioned intermediate active faces 24 of the transducer and the backup members 26 which in turn are secured in the housing 21 on the sides of the diaphragms opposite to the sides facing the active faces of the transducer. Backup members 26 may be secured in the transducer by a suitable retaining member 27 similar to the member 7 previously described. The backup member is similar to the backup member 6 previously described in both structure and function. Passage 28 in the housing 21 opens into the chamber within which the transducer 22 is positioned. This chamber is isolated from the ambient medium which is to be measured and is subjected to ambient pressure fluctuation through the diaphragm 25. A back pressure $P_b$ may be applied from a suitable source of the type previously described through the passage 28 for purposes of recalibration in the same fashion as described earlier. Electrical or other signal connections 29 may be connected to the transducer through the passage 28 with the connection being made to a suitable meter or other output detector.

The device illustrated in FIG. 2 functions in a fashion similar to that described in FIG. 1 and may be used for calibration of the transducer 22 in a manner similar to that previously described.

Referring now to FIG. 3, as illustrated in the embodiment of the invention which is particularly designed for use in recalibrating transducers used in piezometers which are devices ordinarily used to measure the pressure of water within the pores of the soil. The piezometer 50 generally illustrated, is installed in the soil with the pointed end 51 pointing downwardly. The housing 52 of the piezometer is formed with a shoulder 53 at the end opposite the pointed end 51. This shoulder is designed for interengagement and installation on the bottom end of a pipe or drill used for installation purposes. The piezometer housing is driven into the earth by such mechanisms attached to the shoulder portion 53. The transducer 54 within the housing 52 is provided with an active face 55. The sidewalls of the transducer 54 are sealed against the inner surface 56 of the housing 52. These seals may be effected by the pressure seals 57, 58 and 63. Pressure seal 57 comprises an O-ring in an annular groove adjacent the upper end of the transducer.

Pressure seal 58 comprises an O-ring intermediate O-ring 57 and the active face 55. Pressure seal 63 comprises a suitable resilient gasket intermediate an outwardly extending shoulder 63A on the outer wall of the transducer and an inwardly extending shoulder 63B on the inner surface of the housing wall. The seals 57 and 58 effectively seal the interior of the transducer against moisture from either end of the transducer. A chamber 58A is formed within the housing on the upper side of the transducer 54. This chamber communicates with a suitable pressure source for effecting a back pressure $P_b$. A tubular pasage 59 connects the chamber 58A with a chamber 60 between the active face 55 and the transducer 54 and the diaphragm 61. The tubular passage 59 extends longitudinally in a slot 59A in the casing 52. The upper end of the tubular member forming passage 59 extends inwardly and is connected to chamber 58A. The other end of the passage extends through the casing wall and terminates in radial alignment with a porous washer 64. This washer 64 is sufficiently porous for fluid and gas passage between passage 59 and chamber 60. The washer 64 has one annular surface resting on the periphery of the active face 55 and the other surface at an acute angle thereto bearing against the upper surface of diaphrgm 61. The washer hold the diaphragm at a normal distance from active face 55 when $P_a$ is not distending the diaphragm of in the order of 0.003" to 0.004". Thus chamber 60 will ordinarily be in such an order of magnitude in height. The diaphragm 61 is of a flexible material and functions similar to the flexible diaphragms previously described. It is secured at its periphery between washer 64 and a backup member 65.

Backup member 65 extends across the interior of the housing 52 with its side wall facing the inner surface of the housing 52. An O-ring 65A effectively seals the facing surfaces of the housing 52 and the member 65 against passage moisture. This backup member 65 which is similar to those described in the other embodiments is perivous to ambient pressures of the medium being measured. This porosity may be attained by using a sintered porous material such as sintered bronze or a solid block with a plurality of small passages 68 extending therethrough axially from a chamber 69 to a position below backup member 65 within the housing 52. The backup member 65 functions to restrain movement of the diaphragm 61 toward the pointed end 51 and thereby renders the diaphragm 61 a stiff non-yielding member when the back pressure $P_b$ within the chamber 60 exceeds the ambient pressure $P_a$ of the medium within which the piezometer is positioned. The member 65 is secured against the diaphragm by a nut 67 that is externally threaded with its threads interengaging the internal threads on the section 52A of housing 52. This nut compresses and holds diaphragm 61, washer 64, transducer 54 and gasket 63 against shoulder 63B of the housing 52. The manifold-like space 69 is connected by an axial passage 70 to a plurality of radially extending passages 71. These passages 71 terminate at the annular porous filter member 73. This filter member is preferably formed with a lower edge 73A undercutting a shoulder in the housing 52. The opposite edge 73B is secured by a threaded sleeve 75 that threadingly engages the core 76 of the lower section 52B of the housing 52. The section 52B, annular filter member 73, and sleeve 75 form a subassembly that may be interengaged with housing section 52A as a unit after the second assembly of nut 67, member 55, diaphragm 61, washer 64 and transducer 54 have been assembled in section 52A.

In the operation of the invention described in this figure, the ambient presure $P_a$ is sensed through filter 73, passages 71 and 70, backup member 65 to the diaphragm 61. Recalibration is attained by increasing the pressure $P_a$ in chamber 58A in suitable controlled increments. This pressure $P_b$ is transferred through passage 59 to chamber 60 betweeen diaphragm 61 and the active face 55. As the pressure $P_b$ increases over the ambient pressure $P_a$, diaphragm 61 is forced against the backup member 65. At the same time, the known back pressure $P_b$ is sensed by the transducer and may be compared with meter readings of the transducer for recalibrating purposes.

The present invention applies to any pressure transducer measuring any fluid pressure in any application. It may, for example, be used to recalibrate transducers that in turn are used to measure pressure of radioactive fluids in atomic power plants.

What is claimed is:

1. Means for calibrating a pressure transducer responsive to ambient pressures, comprising:
   (a) a housing enclosing at least one pressure responsive portion of said transducer;
   (b) a diaphragm extending across a portion of said housing defining a chamber between said diaphragm and said transducer, said diaphragm adapted on deflection to vary the pressure upon the pressure responsive portions of said transducer;
   (c) means, located on the side of said diaphragm remote from said transducer, for limiting deflection of said diaphragm away from said pressure responsive portions of said transducer, and for allowing ambient pressures to be applied therethrough to said diaphragm; and
   (d) means for applying a known pressure internally of said defining chamber to said pressure responsive portions of said transducer;
   (e) said diaphragm adapted to deflect toward said transducer when the ambient pressure exceeds the known pressure, and adapted to substantially contact said limiting deflection means when the known pressure exceeds the ambient pressure.

2. Means for calibrating a pressure transducer as set forth in claim 1 and further comprising means for increasing the pressure within said defining chamber above normal ambient pressures for purposes of calibrating said transducer.

3. Means for calibrating a pressure transducer as set forth in claim 2 wherein said means for increasing the pressure within said chamber includes means remote from said chamber.

4. Means for calibrating a pressure transducer as set forth in claim 1 wherein said means for limiting deflection of said diaphragm includes a stiff member through which said ambient pressures are applied to said diaphragm and means for securing said stiff member relative to said housing.

5. Means for calibrating a pressure transducer as set forth in claim 4 wherein said transducer has at least two pressure responsive surfaces, said calibrating means comprising a plurality of said diaphragms, means positioning said diahragms in spaced relationship to said surface, a plurality of said stiff members supported relative to said housing on the sides of said diaphragms remote from said transducer and means for increasing said pressure within said housing and for applying said pressure on the surface of one of said diaphragms remote from said transducer.

6. Means for calibrating a pressure transducer as set forth in claim 5 including means supporting said diaphragms in parallel with said transducer positioned therebetween, and said stiff members each including a rigid member having a surface adapted to be engaged by one side of said diaphragms and to limit deflection thereof with said surface being pervious to the medium by which said diaphragm is deflected.

7. Means for calibrating a pressure transducer as set forth in claim 1 wherein said means for applying a known pressure includes means remote from said transducer.

8. Means for calibrating a pressure transducer as set forth in claim 7 including further means remote from said transducer for receiving signals transmitted from said transducer in response to ambient pressure on said transducer.

9. Means for calibrating a pressure transducer as set forth in claim 8 wherein said housing is cylindrical and has a passage formed therein connecting to the pressure responsive surface of said transducer.

10. Means for calibrating a pressure transducer as set forth in claim 8 including an annular washer intermediate and spacing said diaphragm from said pressure responsive surface in said transducer.

11. Means for calibrating a pressure transducer as set forth in claim 10 including a nut threaded to said housing and securing said means for limiting deflection, said diaphragm, said annular washer and said transducer in compressed relation.

12. Means for calibrating a pressure transducer as set forth in claim 11 including said annular washer having a triangular cross-sectional configuration.

References Cited

UNITED STATES PATENTS

| 2,216,374 | 10/1940 | Martin | 73—395 |
| 2,883,995 | 4/1959 | Bailous. | |
| 2,769,341 | 11/1956 | Boisblanc | 73—398 |
| 3,208,264 | 9/1965 | Melton | 73—4 |

S. CLEMENT SWISHER, Primary Examiner